US005828677A

United States Patent [19]
Sayeed et al.

[11] Patent Number: 5,828,677
[45] Date of Patent: Oct. 27, 1998

[54] ADAPTIVE HYBRID ARQ CODING SCHEMES FOR SLOW FADING CHANNELS IN MOBILE RADIO SYSTEMS

[75] Inventors: Zulfiquar Sayeed, Philadelphia, Pa.; Vijitha Weerackody, Watchung, N.J.

[73] Assignee: Lucent Technologies Inc., Murray Hill, N.J.

[21] Appl. No.: 620,053

[22] Filed: Mar. 20, 1996

[51] Int. Cl.[6] ............................. H03M 13/00; H04L 1/16
[52] U.S. Cl. ................................ 371/41; 371/5.5; 371/35
[58] Field of Search .................................. 371/41, 5.5, 35

[56] References Cited

U.S. PATENT DOCUMENTS

| 5,128,942 | 7/1992 | Kojima | 371/5.5 |
|---|---|---|---|
| 5,506,903 | 4/1996 | Yamashita | 380/19 |

OTHER PUBLICATIONS

S. Kallel, "Efficient Hybrid ARQ Protocols With Adaptive Forward Error Correction," *IEEE Transactions on Comm.*, vol. 42, No. 2/3/4, Feb./Mar./Apr., 1994, pp. 281–289.

R. H. Deng, "A Type I Hybrid ARQ System With Adaptive Code Rates," *IEEE Transactions on Comm.*, vol. 43, No. 2/3/4, Feb./Mar./Apr., 1995, pp. 733–737.

B. Vucetic, "An Adaptive Coding Scheme for Time–Varying Channels," *IEEE Transactions on Comm.*, vol. 39, No. 5, May 1991, pp. 653–662.

S. Lin et al., "Automatic–Repeat–Request Error–Control Schemes," *IEEE Communications Magazine*, vol. 22, No. 12, Dec. 1984, pp. 5–16.

S. Yajnik et al, "Adaptive Coding for Packetized Data in Wireless Networks," *Personal Indoor & Mobile Radio Comm. Conference*, Toronto, Canada, Sep. 1995, pp. 1–5.

T–H. Lee et al., "Downlink Power Control Algorithms for Cellular Radio Systems," *IEEE Trans. on Vehicular Tech.*, vol. 44, No. 1, Feb. 1995, pp. 89–94.

J. C–I. Chuang et al. "Uplink Power Control for TDMA Portable Radio Channels," *IEEE Trans. on Vehicular Tech.*, vol. 43, No. 1, Feb. 1994, pp. 33–39.

R. Knopp et al., "Information Capacity And Power Control In Single–Cell Multiuser Communications," *IEEE International Conf. on Comm. (ICC)* 1995, vol. Jun. 18–22, Seattle, Washington, pp. 331–335.

S. Ariyavisitakul, "Autonomous SIR–Based Power Control for a TDMA Radio System," *IEEE Communications Society*, GLOBECOM 1993, Houston, Texas, vol. 1, Nov. 29–Dec. 2, 1993, pp. 307–310.

V. Wong et al., "A Transmit Power Control Scheme for Improving Performance in a Mobile Packet Radio System," *IEEE Trans. on Vehicular Tech.*, vol. 43, No. 1, Feb. 1994, pp. 174–180.

L. C. Yun et al., "Power Control for Variable QOS on a CDMA Channel," *Proc. IEEE MILCOM*, Fort Monmouth, NJ, Oct. 2–5, 1994, pp. 178–182.

(List continued on next page.)

*Primary Examiner*—Stephen M. Baker
*Attorney, Agent, or Firm*—Kenneth M. Brown

[57] ABSTRACT

A method and apparatus for performing adaptive hybrid automatic repeat request (ARQ) coding in which the coding is modified based on the acknowledgements returned by the receiver. In accordance with one illustrative embodiment of the present invention, the state of the channel is implicitly determined by the transmitter based upon the frequency of acknowledgments (ACKs and NACKs) arriving from the receiver. For example, since a NACK implies a weak received signal strength, the code rate of the FEC is advantageously reduced in response to such an acknowledgement. On the other hand, the code rate of the FEC is advantageously increased in response to an ACK. In accordance with another illustrative embodiment of the present invention, the acknowledgement returned by the receiver is modified to convey the number of errors in the corresponding received data packet. In particular, a Reed-Solomon (RS) outer code is employed in the FEC to enable the receiver to determine the number of errors in the received data packet. If the acknowledgement indicates a large number of errors at the receiver, the code rate of the FEC is advantageously reduced in response thereto.

22 Claims, 4 Drawing Sheets

OTHER PUBLICATIONS

D. Moore et al., "Variable Rate Error Control for Wireless ATM Networks," *IEEE International Conf. on Comm. (ICC)* 1995, Jun. 18–22, Seattle, Washington, pp. 988–992.

T. Matsumoto et al., "Performance Analysis of RS–Coded M–ary FSK for Frequency–Hopping Spread Spectrum Mobile Radios," *IEEE Trans. on Vehicular Tech.*, vol. 41, No. 3, Aug. 1992, pp. 266–270.

R. H. Deng, et al., "An Adaptive Coding Scheme With Code Combining for Mobile Radio Systems," *IEEE Trans. on Vehicular Tech.*, vol. 42, No. 4, Nov. 1993, pp. 469–476.

Y. Feria et al., Seamless Data–Rate Change Using Punctured Convolutional Codes for Time–Varying Signal–to–Noise Ratio, *IEEE International Conf. on Comm. (ICC)* 1995, Seattle, Washington, Jun. 18–22, pp. 342–346.

R. R. Gejji, "Forward–Link–Power Control in CDMA Cellular Systems," *IEEE Trans. on Vehicular Tech.*, vol. 41, No. 4, Nov. 1992, pp. 532–536.

A. Sampath et al., Power Control and Resource Management for a Multimedia CDMA Wireless System,: *IEEE Proc. of the Personal Indoor & Mobile Radio Comm. Conf. (PIMRC*, Toronto, Canada, Sep. 25–29, 1995, pp. 21–25.

Shiozaki, A., et al., "A Hybrid ARQ Scheme with Adaptive Forward Error Correction for Satellite Communications", IEEE Transactions on Communications, vol. 39, No. 4, Apr. 1991, pp. 482–484.

Rice, M., et al., "Adaptive Error Control for Slowly Varying Channels", IEEE Transactions on Communications, vol. 42, No. 2/3/4, Feb./Mar./Apr. 1994, pp. 917–926.

Merel, D., "An Adaptive Half Duplex Data Transmission FEC/ARQ Procedure: Results on Real Ionospheric Channel", HF Radio Systems and Techniques, Conference Publication No. 392, IEE, Jul. 1994, pp. 197–201.

Aridhi, S., et al., "Performance Analysis of Type–I and Type–II Hybrid ARQ Protocols using Concatenated Codes in a DS–CDMA Rayleigh Fading Channel", Universal Personal Communications, Dec. 1995 4th Int'l. Conf., 748–752.

FIG. 2A U: UNCODED
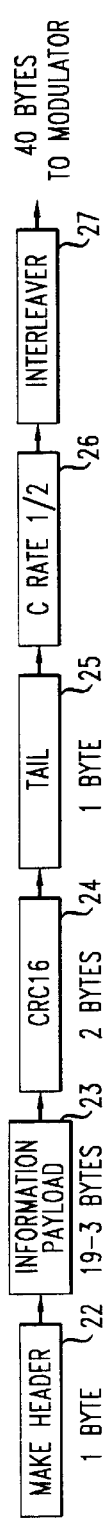
FIG. 2B C: FULL CONVOLUTION CODED
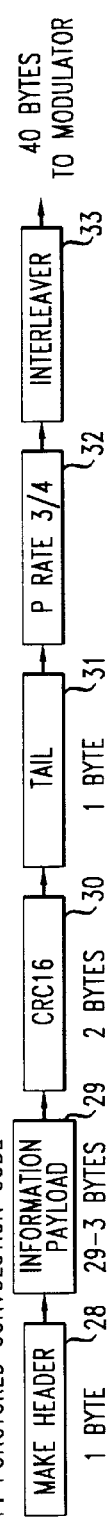
FIG. 2C P: PUNCTURED CONVOLUTION CODE
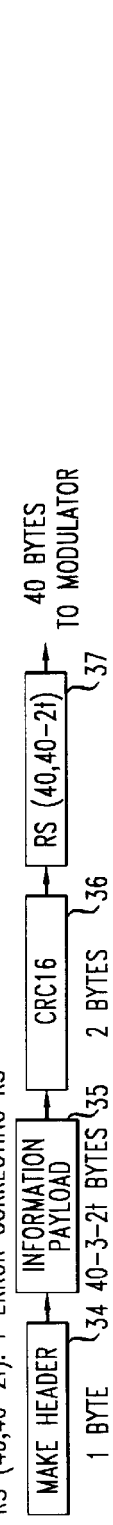
FIG. 2D RS (40,40−2t): t−ERROR CORRECTING RS
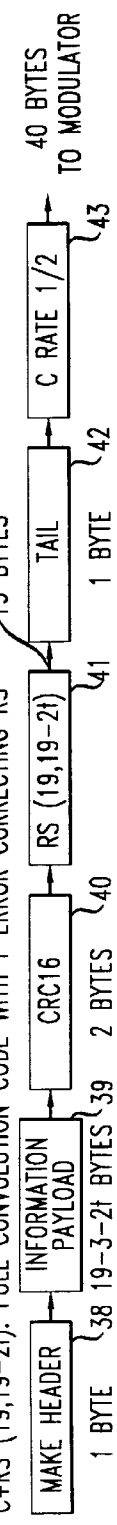
FIG. 2E C+RS (19,19−2t): FULL CONVOLUTION CODE WITH t−ERROR CORRECTING RS
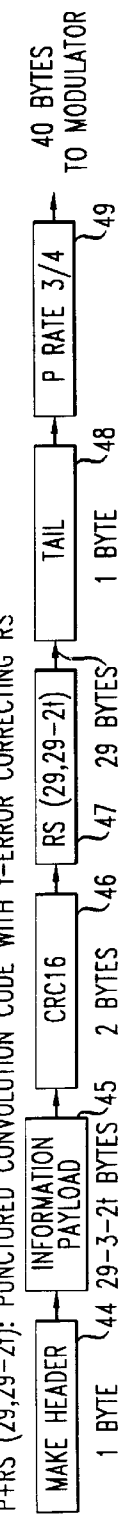
FIG. 2F P+RS (29,29−2t): PUNCTURED CONVOLUTION CODE WITH t−ERROR CORRECTING RS

ADAPTIVE HYBRID ARQ CODING SCHEMES FOR SLOW FADING CHANNELS IN MOBILE RADIO SYSTEMS

CROSS-REFERENCE TO RELATED APPLICATION

The subject matter of this application is related to that of the U.S. patent application of P. Agrawal, B. Narendran, J. Sienicki and S. Yajnik, entitled "An Adaptive Power Control and Coding Scheme for Mobile Radio Stations," Ser. No. 08/600,696, filed on Feb. 13, 1996 and assigned to the assignee of the present invention. "An Adaptive Power Control and Coding Scheme for Mobile Radio Stations" is hereby incorporated by reference as if fully set forth herein.

FIELD OF THE INVENTION

The present invention relates to the field of mobile radio communications systems and more particularly to the problem of increasing the quality of a wireless transmission without substantially decreasing the overall throughput of the communications channel.

BACKGROUND OF THE INVENTION

Mobile radio channels are often characterized by the unpredictability of the channel due to, inter alia, Rayleigh fading and long term shadow fading. The channel quality may degrade as a result of several factors such as, for example, co-channel interference, adjacent channel interference, propagation path loss, and multi-path propagation (i.e., rayleigh fading). Transmission errors typically occur in bursts when fading causes the signal level to go below the noise or interference level. Therefore, explicit measures often need to be taken to maintain an acceptable level of quality of the transmission over a radio channel.

The quality of the transmission over a radio channel connection may be measured by the reliability with which the receiver receives the transmitted data. This channel reliability may, for example, be defined in terms of the bit-error-rate (BER) as experienced at the receiver.

Specifically, forward error correction (FEC) and automatic repeat request (ARQ) are two well-known error control techniques commonly used for noisy and fading channels. In a system that uses FEC for error control, for example, the transmitter encodes the data using a given redundancy code, while the receiver, which has been informed of the code used, decodes the data at the receiving end. Many such systems using conventional block or convolutional codes have been explored and/or employed. In a system that uses ARQ, the receiver returns (i.e., transmits back to the transmitter) an acknowledgement which indicates whether the given transmitted packet was received free of errors (in which case an acknowledgement signal, or "ACK" is sent), or whether it was received erroneously (in which case a negative acknowledgement signal, or "NACK" is sent). If the packet was not received error-free (i.e., if the transmitter receives back a "NACK" signal), the transmitter then re-transmits the same packet again, anticipating that the packet will be successfully received on this (or else on a further, subsequent) transmission.

Transmission of multimedia applications such as high quality audio, images and real-time video, for example, require very low bit-error-rates—typically $10^{-6}$ or less. Obtaining such low BERs in wireless environments is challenging, even in the presence of very low rate forward error correction codes. ARQ techniques, however, provide very reliable communication, albeit at the expense of variable and sometimes large delays. But hybrid ARQ schemes, in which both FEC and ARQ techniques are employed simultaneously, are particularly attractive because they combine the fixed delay error correction capability of FEC techniques with the low BER of basic ARQ schemes. Such hybrid ARQ schemes are described, for example, in S. Lin, D. Costello and M. J. Miller, "Automatic Repeat Request Error Control Scheme," IEEE Communications Magazine, vol. 22, no. 12, pp. 5–16, December, 1984, which is hereby incorporated by reference as if fully set forth herein.

In slow fading channels (e.g., channels in which the fade rate is much smaller than the symbol rate), the performance gains obtained from an FEC technique depends on the state of the channel. For example, when the received signal-to-noise ratio (SNR) is large, an uncoded system or a high code rate FEC is sufficient to give a satisfactory BER. On the other hand, for lower received SNRs, a very low rate FEC may be necessary to meet the requirements. Adaptive hybrid ARQ schemes can be used very efficiently in slow fading channels, since in a slow fading channel the channel remains in a particular state for relatively long periods of time. An adaptive hybrid ARQ scheme takes into account the fact that the channel is good for long periods of time and advantageously transmits information using a high rate FEC during those times. However, when the channel conditions are deteriorating, the adaptive hybrid ARQ scheme switches to a low rate code. Changing the rate of the FEC reduces the overhead that is transmitted and thus improves the channel throughput. In comparison to non-adaptive hybrid ARQ schemes, adaptive schemes employ fewer bits for error correction. Therefore, these adaptive schemes typically result in a better overall throughput than do non-adaptive schemes.

In prior art adaptive hybrid ARQ schemes, the adaptation of the code depends on explicit estimates of the channel conditions. For example, the channel conditions may be determined based on the BER, which necessarily must be measured (over a period of time) by the receiver. This information is then transmitted back to the transmitter, which then adapts the error code based thereon. Therefore, these schemes require that conventional hybrid ARQ receivers be modified, both to perform an analysis to make such a determination (e.g., to calculate the BER over time), and, moreover, to transmit the additional data back to the transmitter. It would be preferable, however, to provide for an adaptive hybrid ARQ scheme that can be used with conventional hybrid ARQ receivers. That is, it would be desirable to provide such a scheme which does not require that the receiver be burdened with such an additional analysis task, and, more importantly, one that does not require additional data be transmitted (back from the receiver).

SUMMARY OF THE INVENTION

In accordance with an illustrative embodiment of the present invention, a method and apparatus for performing adaptive hybrid ARQ coding is provided in which the state of the channel is implicitly determined by the transmitter based upon the frequency of acknowledgments (ACKs and NACKs) arriving from the receiver. For example, since a NACK implies a weak received signal strength, the code rate of the FEC may be advantageously reduced in response to such an acknowledgement. On the other hand, the code rate of the FEC may be advantageously increased in response to an ACK.

In accordance with another illustrative embodiment of the present invention, the acknowledgement returned by the receiver is modified to convey the number of errors in the corresponding received data packet. In particular, a Reed-Solomon (RS) outer code is employed in the FEC to enable the receiver to determine the number of errors in the received data packet. If the acknowledgement indicates a large number of errors at the receiver, the code rate of the FEC may be advantageously reduced in response thereto.

BRIEF DESCRIPTION OF THE DRAWINGS

FIGS. 2A–2F show illustrative data packets coded with various FEC codes (and corresponding byte assignments therefor) in accordance with an illustrative embodiment of the present invention.

DETAILED DESCRIPTION

Introduction

Figure 1A:
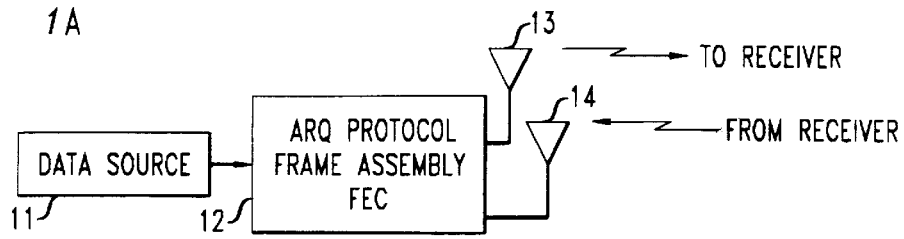
FIG. 1A shows a mobile radio transmitter in accordance with an illustrative embodiment of the present invention.

In accordance with an illustrative embodiment of the present invention, the "go-back-N"ARQ protocol, familiar to those skilled in the art, is used as the basis of the illustrative systems described herein The illustrative transmitter of the present invention is shown in FIG. 1A. Specifically, data source 11 provides the data to be transmitted to frame assembly module 12, which transmits packets to the receiver via antenna 13 and receives acknowledgement data from the receiver via antenna 14.

Figure 1B:
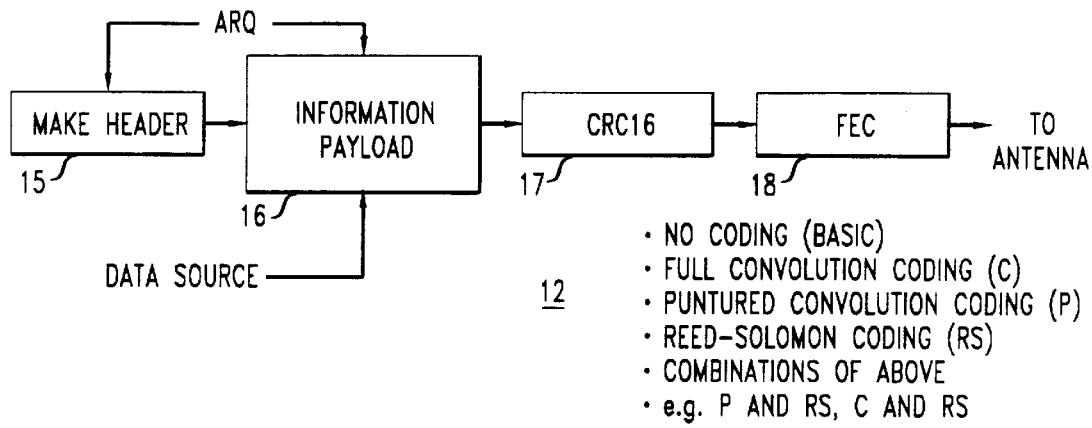
FIG. 1B shows the generation of a data packet which is to be transmitted by the illustrative transmitter of FIG. 1A.

As shown in FIG. 1B, the ARQ protocol generates the header for each packet in make header module 15. The packet number which identifies the packet is contained in the header. The data to be transmitted (as provided by data source 11) is incorporated in the packet by information payload module 16. Next, error detection is added by CRC16 module 17, using a (16-bit) Cyclic-Redundancy-Check code, well-known to those skilled in the art. Finally, FEC module 18 adds the error correcting code (if any).

In the "go-back-N" protocol, the value of "N" is dependent on the round trip delay and the size of the data buffer at the transmitter. Illustratively, "N" may, for example, be set to 7. Also, the forward and the reverse channel delays may illustratively be set to one packet length each. The total length of the packet shown in FIG. 1B may illustratively be set to 40 bytes. As shown in FIG. 1B, this includes the packet header, the CRC16 for error detection and the FEC (as well as the data itself). The FECs are used to give better error protection to the transmitted data symbols.

Specifically, the FECs used in accordance with the various illustrative embodiments of the present invention include one or more of the following codes:

Convolutional Code (C): The illustrative convolutional code used is a rate ½, constraint length 9 convolutional code, familiar to those skilled in the art. Since the receiver must decode each packet on a packet by packet basis, the last 8 encoded bits are advantageously set to zero.

Punctured Convolutional Code (P): The convolutional encoded data available from the rate ½ convolutional code is illustratively punctured with a rate ⅚ puncturing table so that the effective code rate is ¾.Such punctured convolutional codes are also familiar to those of ordinary skill in the art.

Reed-Solomon Code (RS(n,k)): This illustrative (n,k) Reed-Solomon (RS) code, also familiar to those skilled in the art, operates over Galois Field 256 (GF256). The RS code is advantageously used as an outer code, and the length of the code-word depends on the inner code used (see below for the particular illustrative codes which are used). A RS(n,k) code advantageously corrects up to $t=(n-k)/2$ errors (where n, k and t are assumed to be in bytes).

The modulation scheme may illustratively comprise Quadrature Phase Shift Keying (QPSK) with ideal coherent demodulation, familiar to those skilled in the art. The channel may be modeled as Rayleigh fading with a Doppler frequency $(f_D) \times $ symbol period=$4.34 \times 10^{-6}$. (For a carrier frequency of 900 MHz and a mobile speed of 1 km/h, this corresponds to a data rate of 192 kb/s.) In the simulation results shown below, it is assumed that the return channel is error-free, although the protocol is designed to operate under non-ideal return channel conditions.

Prior art ARQ schemes

Various FECs are described herein for use with the "go-back-N" ARQ scheme, as shown in FIGS. 2A–2F. The results of simulations of prior art systems using certain of these FEC schemes are used for purposes of comparison to the performance of certain illustrative adaptive hybrid ARQ schemes in accordance with the present invention (as presented below).

The basic "go-back-N" ARQ scheme uses uncoded data packets. FIG. 2A shows such a packet along with the byte assignments therefor. In particular, the data packets are uncoded and, as shown, 37 bytes of information bits are used as the payload (block 20). The header (block 19) is one byte, and two bytes of CRC16 parity data (block 21) are added to the frame. The receiver demodulates the data and determines whether there are any errors in the received packet. If an error is found the receiver initiates a re-transmission request by sending a NACK signal. The header in this case is one byte long as shown in FIG. 2A of the packet, and the last three bits are set to zero.

Figure 3:
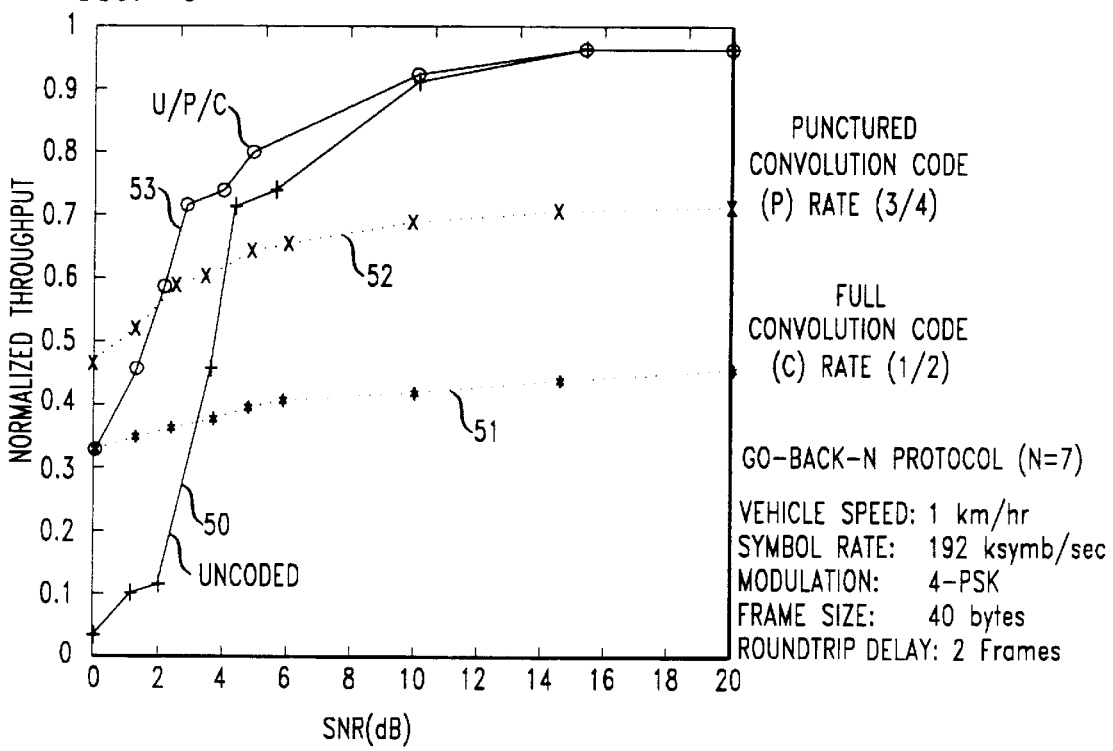
FIG. 3 shows the results of simulated performances of prior art ARQ schemes as compared with a first illustrative embodiment of the present invention.

The throughput of the system is calculated as the ratio of the number of bits that are delivered, error-free to the receiver, to the total number of bits, excluding the CRC parity bits, that are transmitted. The throughput for this uncoded system is shown in FIG. 3, plotted as curve 50. Note that at high SNRs, most of the packets are delivered error-free and therefore the normalized throughput is close to unity. On the other hand, the throughput is very poor at low SNRs because very few packets will be delivered correctly.

The next case is a Convolutional Coded System (C), as shown in FIG. 2B. In this case, a rate ½, constraint length 9 convolutional code is used as the FEC (block 26) with a 16×20 block interleaver (block 27). The byte assignment can be seen in the figure. Since the total number of symbols in a packet is illustratively fixed at 40 bytes, there are only 16 bytes of information data (as shown in block 23). The header structure (block 22) and the throughput calculation is the same in this case as in the previous basic "go-back-N" case shown in FIG. 2A.

The performance of the system for this case is shown in FIG. 3 by curve 51. Since the FEC is rate ½, the maximum achievable throughput is necessarily 50%. Because of the error correction capability of the FEC, the coded system operates very well at low SNRs. However, at high SNRs, performance is poor in comparison to the uncoded system. This is because at high SNRs, error correction is not necessary and the FEC adds overhead which reduces the throughput. The throughput at a SNR of zero dB is about 35% for this convolutional coded system. The corresponding throughput for the uncoded system is about 5%. However at high SNRs, coding is not necessary, and consequently the throughput for the uncoded system is almost 100%, whereas the coded system gives a throughput of only about 45%.

The next case is a Punctured Convolutional Coded System (P), as shown in FIG. 2C. The byte-assignment for this system can also be seen in the figure. The rate ¾ FEC is derived from puncturing the rate ½, constraint length 9 convolutional code (block 32). As in the Full Convolutional Coded case, a block interleaver of size 16×20 (block 33) is used. Each packet contains 26 bytes of information (as shown in block 29), so that the total number of channel symbols comprises 40 bytes.

The throughput of the system in this case is shown in FIG. 3 by curve 52. Since the code is a rate ¾ FEC code, the throughput is ≦75%. It can be seen that even at relatively low SNRs, the system employing the punctured convolutional code outperforms the convolutionally coded system.

A first illustrative embodiment

From the results presented above, it can be seen that to increase the throughput, a system without error correction is preferred at higher SNRs and an FEC system is useful at lower SNRs. Adaptive schemes in accordance with various illustrative embodiments of the present invention achieve this objective by using a powerful FEC when there are "too many" NACK signals received back from the receiver, and by using either no coding or a weaker FEC in the presence of ACK signals.

Figure 4:
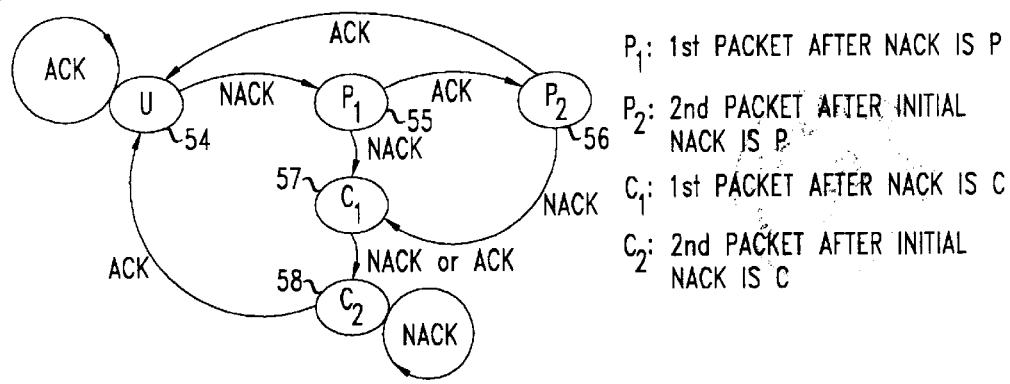
FIG. 4 shows a transmitter state flow graph in accordance with a first illustrative embodiment of the present invention.

In accordance with a first illustrative embodiment of the present invention, an adaptive error correction code is used by what will be referred to herein as the U/P/C system. In particular, a state flow-graph of the transmitter of the U/P/C system is shown in FIG. 4. The illustrative system initially employs no coding and remains in state 54 until a NACK signal is encountered. In response to a NACK signal, the transmitter encodes the packet using a rate ¾ punctured convolutional code and transitions to the first P state (55). The transmitter remains in this mode and uses the rate ¾ punctured convolutional code for two packets (states 55 and 56). However, if a NACK signal is received within those two packets, the transmitter transitions to the first C state and uses the rate ½ convolutional code for the next two frames (states 57 and 58). If after the first and second convolutionally encoded packets a NACK signal is not received, then the system goes back to state U (state 54), the uncoded state. However, if NACK signals are received when the rate ½ convolutional code is being used, the system remains in the convolutionally encoded state C (state 58).

The byte assignment for this illustrative system is as shown in FIGS. 2A–2C. The header is constructed as in the basic uncoded ARQ system. The performance of this illustrative system is shown in FIG. 3 by curve 53. It can be seen that the performance of this system is as good as the uncoded system at high SNRs, and that at low SNRs it is better than the convolutionally coded system. At very low SNRs, the illustrative system stays in the convolutionally encoded state most of the time due to the frequency of re-transmission requests. Thus, in such a case, the throughput reaches that of the hybrid convolutionally coded ARQ scheme. On the other hand, at high SNRs, ACK signals are received most of the time, and, therefore, the system performance approaches that of a basic uncoded ARQ system.

A second illustrative embodiment

Figure 5:
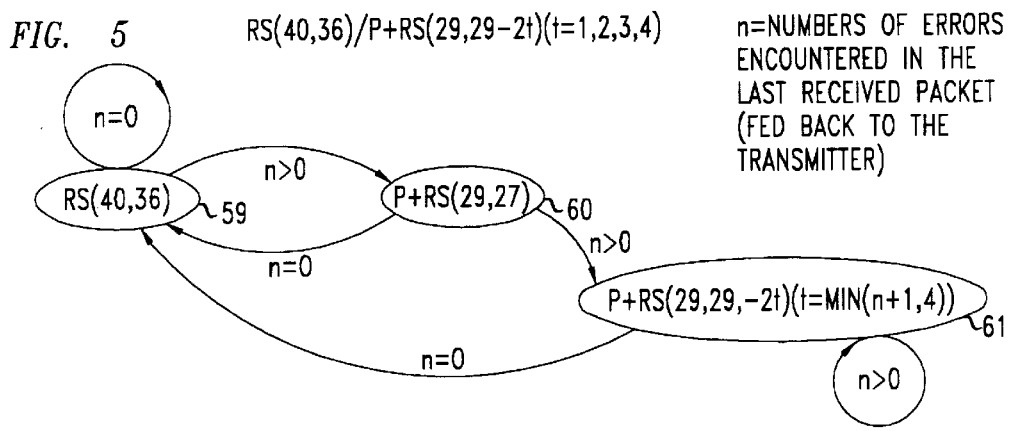
FIG. 5 shows a transmitter state flow graph in accordance with a second illustrative embodiment of the present invention.

In accordance with a second illustrative embodiment of the present invention, a punctured convolutional code with a RS code is used. In addition, the acknowledgement signal returned by the receiver is modified to carry the number of bytes in the received packet that are in error. The illustrative system starts off with a RS(40,36) code—that is, a 2-error correcting Reed-Solomon code with n=40 bytes, k=36 bytes and t=2 bytes. (Here, "n" represents the length of the RS codeword in bytes, "k" represents the number of bytes that are considered to be information bytes by the encoder, and "t" represents the error correction capability of the RS code.) A state flow graph for the transmitter of this system is shown in FIG. 5. The byte assignments used by the system in its initial state are shown in FIG. 2D. Note that of the "k" bytes going into the RS encoder (block 37), one byte is for the header (block 34), 33 bytes are for information data (block 35) and 2 bytes are for the CRC error detection code (block 36). Note also that the RS code can be used to declare packet erasures as well. However, in this case, the CRC is illustratively used for error detection.

In accordance with this second illustrative embodiment, the receiver not only sends back ACK signals and NACK signals, but also sends the number of byte errors that occurred in the most recently received packet. The first four bits of the header of the packet that is sent from the transmitter to the receiver contain the sequence number, and the rest of the bits are set to zero. The header of the packet from the receiver to the transmitter contains the request number in the first four bits (for identification purposes), and the number of errors detected by the Berlekamp-Massey decoder in the last four bits. (As is well known to those of ordinary skill in the art, the Berlekamp-Massey decoder is a conventional decoder for use with RS encodings.)

The transmitter of the illustrative system of the second embodiment uses a t-error correcting code where t=1, 2, 3, or 4. That is, the transmitter encodes the data using either one of the above four RS codes. In the state flow graph of FIG. 5, the number of errors that are fed back from the receiver is denoted as "n". Since the transmitter can use up to a 4-error correcting RS code, n=0, 1, 2, 3 or 4. If more than four errors are detected, then "n" in the acknowledgement signal is set to 4.

Specifically, the transmitter begins in state 59, sending data using the RS(40,36) code. Upon receiving an indication that n>0, the transmitter transitions to state 60 where it uses a punctured convolutional code with RS(29,27) in the next packet. If the next feedback received indicates that n=0, the transmitter goes back to sending RS(40,36) packets by transitioning back to state 59. For non-zero "n," the transmitter transitions to state 61, where it sends packets that are punctured convolutional encoded and concatenated with a RS code of error-correction capability of the lesser of (n+1) and 4—this is denoted by "(P+RS(29,29−2t)) (t=min(n+1, 4))."

To illustrate this coding scheme according to this notation, if the current packet is (P+RS(29,29−2t)), then the t-error-correcting RS code generates a codeword 29 bytes long. As depicted in FIG. 2F, the number of bytes going into the RS encoder (block 47) is 29–2t, the header (block 44) is one byte, the CRC (block 46) is 2 bytes, and the information payload (block 45) is 29-3-2t bytes. A single byte of tail-bits is added to this 29 word RS code (in block 48) and the resulting 30 bytes are encoded by a rate ¾ punctured convolutional code (in block 49) to obtain the 40 byte long (P+RS(29,29–2t)) packet.

Figure 6:
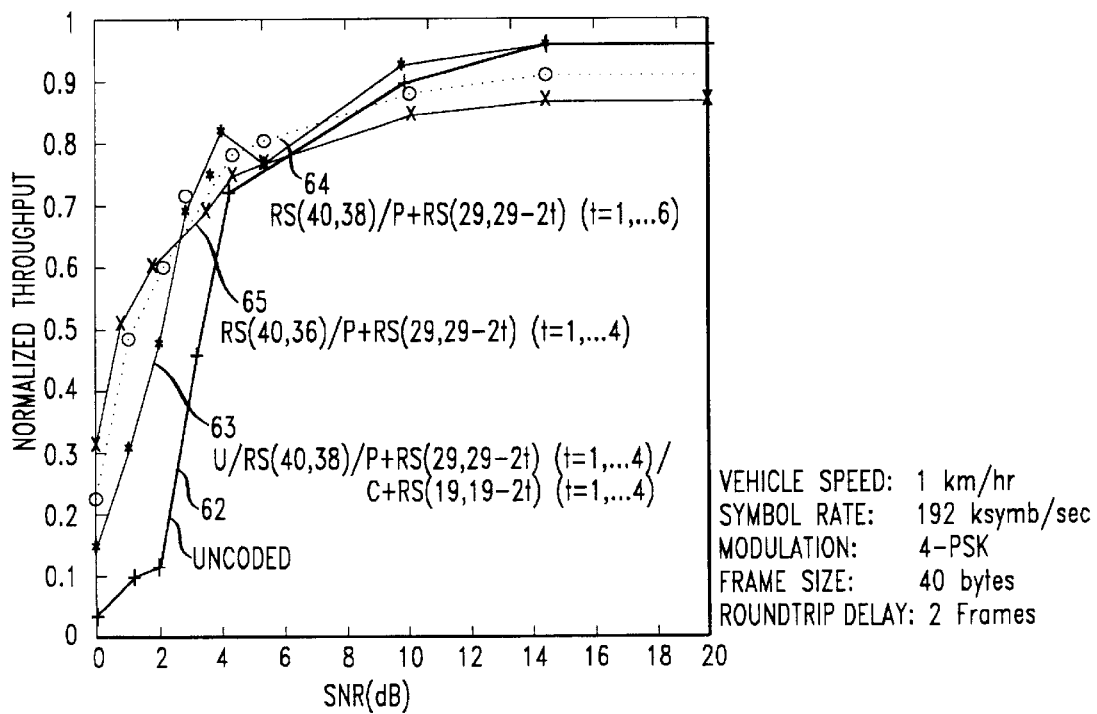
FIG. 6 shows the results of a simulated performance of a prior art ARQ scheme as compared with second, third and fourth illustrative embodiments of the present invention.

The performance for the system of the second illustrative embodiment is shown in FIG. 6 by curve 65. The throughput of the system is calculated as in the basic ARQ system. That is, the throughput is the ratio of the number of bits that are successfully delivered, to the total bits, excluding the CRC parity bits, that are transmitted. As can be seen from this figure, the system performance at high SNRs saturates around 82%, and a reasonably high throughput is obtained at lower SNRs.

A third illustrative embodiment

In accordance with a third illustrative embodiment of the present invention, the maximum error correcting capability of the RS code is 6, and, instead of the using RS(40,36) as in the case of the second illustrative embodiment, we use a higher rate code, RS(40,38). Otherwise, the transmitter of the third illustrative embodiment is similar to that of the second illustrative embodiment, the state flow graph of which is shown in FIG. 5. FIG. 6 depicts the performance of this third illustrative system in curve 64 (shown as a dotted line), where it is labeled as "RS(40,38)/P+RS(29,29–2t) (t=1, . . . 6)." Note that at high SNRs, the effective FEC used in this system is RS(40,38), whereas it is RS(40,36) in the previously described system (i.e., the second illustrative embodiment). Since the overhead introduced by RS(40,38) is less than that introduced by RS(40,36), the throughput is slightly higher for this system at high SNRs. At very low SNRs, the effective FEC for the previously described system is the rate ¾ punctured convolutional code and RS(40,21), as denoted by "P+RS(40,21)." For this system, however, the corresponding FEC is "P+RS(40,17)." At very low SNRs, because of the punctured code, the error correction capabilities of these codes are similar. However, because the redundancy added by the RS(40,17) is more, the throughput of this system is slightly lower.

A fourth illustrative embodiment

Figure 7:
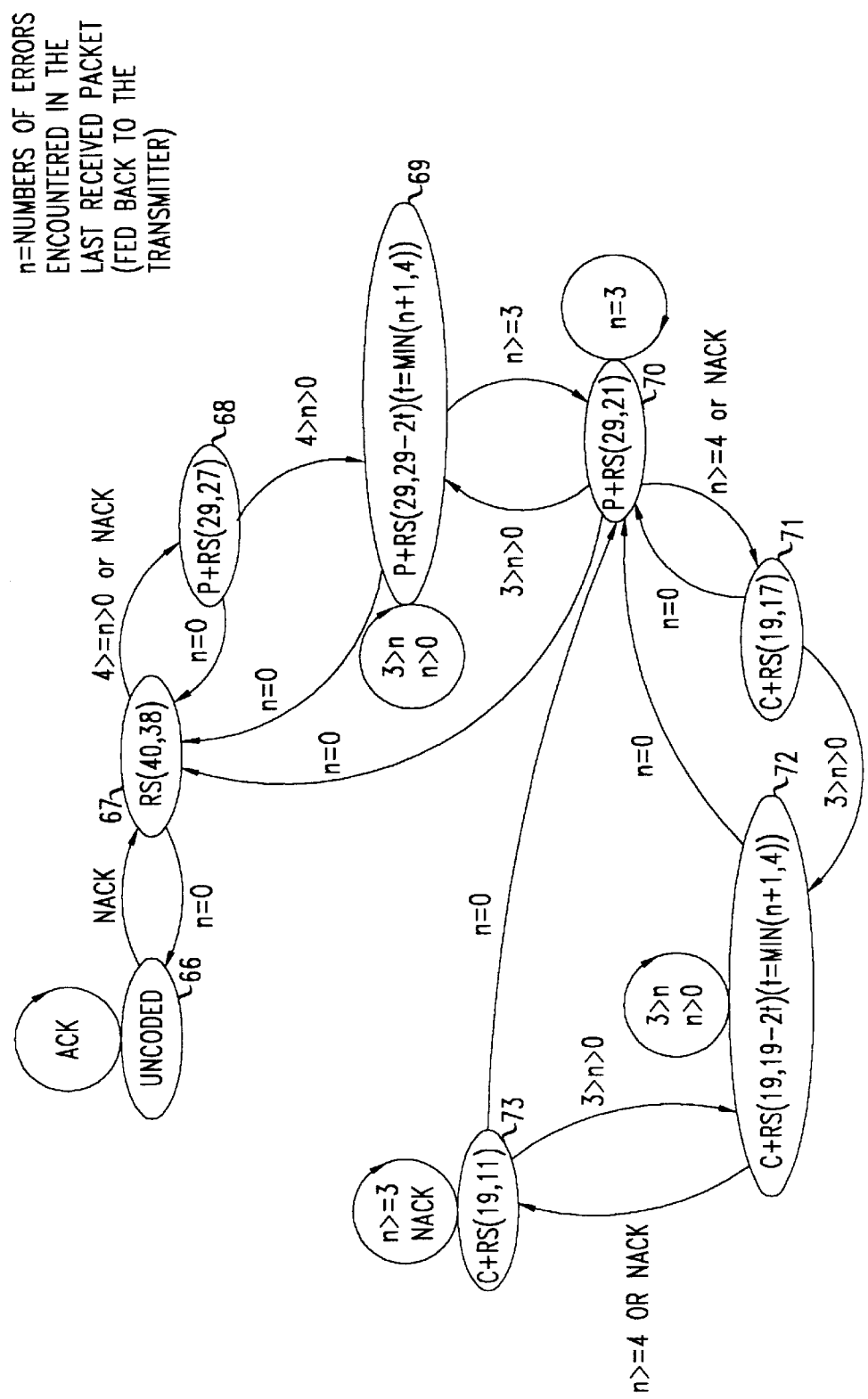
FIG. 7 shows a transmitter state flow graph in accordance with a fourth illustrative embodiment of the present invention.

In accordance with a fourth illustrative embodiment of the present invention, rate ½convolutional, rate ¾ punctured convolutional, RS codes are used, as well as the uncoded case with the ARQ scheme. The state flow graph for the transmitter of this system is given in FIG. 7. As shown in the figure, the illustrative transmitter uses a combination of FECs, as well as uncoded data. The possible combinations of FECs are denoted by RS(40,38), (P+RS(29,29–2t))(t=1, . . . 4), and (C+RS(19,19-2t))(t=1 . . . 4). The byte-assignments for the different states are shown in FIGS. 2A, 2D, 2E and 2F. The performance of the system is shown in FIG. 6 by curve 63 and is labeled by "U/RS(40,38)/P+RS (29,29–2t)(t=1, . . . 4)/C+RS(19,19-2t)(t=1, . . . 4)." The throughput of this illustrative system is the highest for the high SNR points due to the incorporation of the uncoded case into the system.

Although several specific embodiments of this invention have been shown and described herein, it is to be understood that these embodiments are merely illustrative of the many possible specific arrangements which can be devised in application of the principles of the invention. For example, although the illustrative embodiments disclosed above were described and analyzed in the context of the "go-back-N" ARQ protocol, it will be obvious to those of ordinary skill in the art that these adaptive schemes can also be used with selective repeat and/or stop-and-wait protocols—two other commonly used ARQ protocols familiar to those of ordinary skill in the art. Numerous and varied other arrangements can be devised in accordance with these principles by those of ordinary skill in the art without departing from the spirit and scope of the invention.

We claim:

1. A method of transmitting a signal to a receiver across a wireless communications channel, the method comprising the steps of:

encoding a first portion of the signal with a first code to generate a first encoded signal portion:

transmitting the first encoded signal portion across the channel to the receiver, receiving acknowledgement data from the receiver, said acknowledgement data comprising information representative of whether the transmitted signal portion was received by the receiver without error:

determining a second code based on the received acknowledgement data:

encoding a second portion of the signal with the second code to generate a second encoded signal portion, and transmitting the second encoded signal portion across the channel to the receiver, wherein at least one of the first and second codes comprises a combination of a full convolutional code and an error correcting code.

2. The method of claim 1 wherein the error correcting code comprises a Reed Solomon code.

3. The method of claim 1 wherein the acknowledgement data received from the receiver further comprises information representative of a number of errors detected by the receiver when the transmitted signal portion was not received by the receiver without error, and wherein the step of determining the second code is based on said number of errors detected by the receiver.

4. The method of claim 1 wherein at least one of the first and second codes comprises a cyclic-redundancy-check code.

5. The method of claim 4 wherein the cyclic-redundancy-check code comprised in the at least one of the first and second codes is the only error detecting code comprised therein.

6. A method of transmitting a signal to a receiver across a wireless communications channel. the method comprising the steps of:

encoding a first portion of the signal with a first code to generate a first encoded signal portion;

transmitting the first encoded signal portion across the channel to the receiver:

receiving acknowledgement data from the receiver, said acknowledgement data comprising information representative of whether the transmitted signal portion was received by the receiver without error:

determining a second code based on the received acknowledgement data:

encoding a second portion of the signal with the second code to generate a second encoded signal portion; and transmitting the second encoded signal portion across the channel to the receiver.

wherein at least one of the first and second codes comprises a combination of a punctured convolutional code and an error correcting code.

7. The method of claim 6 wherein the error correcting code comprises a Reed Solomon code.

8. The method of claim 6 wherein the acknowledgement data received from the receiver further comprises information representative of a number of errors detected by the receiver when the transmitted signal portion was not received by the receiver without error, and wherein the step of determining the second code is based on said number of errors detected by the receiver.

9. The method of claim 6 wherein at least one of the first and second codes comprises a cyclic-redundancy-check code.

10. The method of claim 9 wherein the cyclic-redundancy-check code comprised in the at least one of the first and second codes is the only error detecting code comprised therein.

11. A method of transmitting a signal to a receiver across a wireless communications channel, the method comprising the steps of:
    encoding a first portion of the signal with a first code to generate a first encoded signal portion;
    transmitting the first encoded signal portion across the channel to the receiver;
    receiving acknowledgement data from the receiver, said acknowledgement data comprising information representative of whether the transmitted signal portion was received by the receiver without error;
    determining a second code based on the received acknowledgement data;
    encoding a second portion of the signal with the second code to generate a second encoded signal portion; and
    transmitting the second encoded signal portion across the channel to the receiver,
        wherein at least one of the first and second codes comprises an error correcting code and
        wherein the error correcting code comprises a Reed Solomon code,
            wherein the acknowledgement data received from the receiver further comprises information representative of a number of errors detected by the receiver when the transmitted signal portion was not received by the receiver without error, and
            wherein the step of determining the second code is based on said number of errors detected by the receiver.

12. An apparatus for transmitting a signal to a remote receiver across a wireless communications channel, the apparatus comprising:
    an encoder adapted to encode a first portion of the signal with a first code to generate a first encoded signal portion and adapted to encode a second portion of the signal with a second code to generate a second encoded signal portion;
    a transmitter adapted to transmit the first encoded signal portion across the channel to the remote receiver and adapted to transmit the second encoded signal portion across the channel to the remote receiver;
    an acknowledgement receiver adapted to receive acknowledgement data from the remote receiver, said acknowledgement data comprising information representative of whether the first encoded signal portion transmitted by the transmitter was received by the remote receiver without error; and
    means for determining the second code based on the received acknowledgement data
        wherein at least one of the first and second codes comprises a combination of a full convolutional code and an error correcting code.

13. The apparatus of claim 12 wherein the error correcting code comprises a Reed Solomon code.

14. The apparatus of claim 12 wherein the acknowledgement data received from the remote receiver further comprises information representative of a number of errors detected by the remote receiver when the transmitted signal portion was not received by the remote receiver without error, and wherein the means for determining the second code is based on said number of errors detected by the remote receiver.

15. The apparatus of claim 12 wherein at least one of the first and second codes comprises a cyclic-redundancy-check code.

16. The apparatus of claim 15 wherein the cyclic-redundancy-check code comprised in the at least one of the first and second codes is the only error detecting code comprised therein.

17. An apparatus for transmitting a signal to a remote receiver across a wireless communications channel, the apparatus comprising:
    an encoder adapted to encode a first portion of the signal with a first code to generate a first encoded signal portion and adapted to encode a second portion of the signal with a second code to generate a second encoded signal portion;
    a transmitter adapted to transmit the first encoded signal portion across the channel to the remote receiver and adapted to transmit the second encoded signal portion across the channel to the remote receiver;
    an acknowledgement receiver adapted to receive acknowledgement data from the remote receiver, said acknowledgement data comprising information representative of whether the first encoded signal portion transmitted by the transmitter was received by the remote receiver without error; and
    means for determining the second code based on the received acknowledgement data,
        wherein at least one of the first and second codes comprises a combination of a punctured convolutional code and an error correcting code.

18. The apparatus of claim 17 wherein the error correcting code comprises a Reed Solomon code.

19. The apparatus of claim 17 wherein the acknowledgement data received from the remote receiver further comprises information representative of a number of errors detected by the remote receiver when the transmitted signal portion was not received by the remote receiver without error, and wherein the means for determining the second code is based on said number of errors detected by the remote receiver.

20. The apparatus of claim 17 wherein at least one of the first and second codes comprises a cyclic-redundancy-check code.

21. The apparatus of claim 20 wherein the cyclic-redundancy-check code comprised in the at least one of the first and second codes is the only error detecting code comprised therein.

22. An apparatus for transmitting a signal to a remote receiver across a wireless communications channel, the apparatus comprising:
    an encoder adapted to encode a first portion of the signal with a first code to generate a first encoded signal portion;
    a transmitter adapted to transmit the first encoded signal portion across the channel to the remote receiver and adapted to encode a second portion of the signal with a second code to generate a second encoded signal portion;

an acknowledgement receiver adapted to receive acknowledgement data from the remote receiver, said acknowledgement data comprising information representative of whether the first encoded signal portion transmitted by the transmitter was received by the remote receiver without error; and means for determining the second code based on the received acknowledgement data, wherein at least one of the first and second codes comprises an error correcting code and wherein the error correcting code comprises a Reed Solomon code, wherein the acknowledgement data received from the remote receiver further comprises information representative of a number of errors detected by the remote receiver when the transmitted signal portion was not received by the remote receiver without error, and wherein the means for determining the second code is based on ,said number of errors detected by the remote receiver.

* * * * *